(12) United States Patent
Park et al.

(10) Patent No.: US 10,563,052 B2
(45) Date of Patent: Feb. 18, 2020

(54) BIOPLASTIC COMPOSITION COMPRISING WHEAT BRAN AND BIOPLASTIC FILM USING THE SAME

(71) Applicant: CJ Cheiljedang Corporation, Seoul (KR)

(72) Inventors: Eun Jin Park, Seoul (KR); Hye Min Choi, Seoul (KR); Sang Gwon Moon, Seoul (KR)

(73) Assignee: CJ Cheiljedang Corporation, Seoul (KR)

( * ) Notice: Subject to any disclaimer, the term of this patent is extended or adjusted under 35 U.S.C. 154(b) by 0 days.

(21) Appl. No.: 15/244,245

(22) Filed: Aug. 23, 2016

(65) Prior Publication Data

US 2018/0002513 A1 Jan. 4, 2018

(30) Foreign Application Priority Data

Jul. 1, 2016 (KR) ........................ 10-2016-0083391

(51) Int. Cl.
| | |
|---|---|
| C08L 23/06 | (2006.01) |
| C08J 5/18 | (2006.01) |
| C08L 97/02 | (2006.01) |
| C08L 23/08 | (2006.01) |

(52) U.S. Cl.
CPC ............ C08L 23/06 (2013.01); C08J 5/18 (2013.01); C08L 23/0815 (2013.01); C08L 97/02 (2013.01); C08J 2323/06 (2013.01); C08J 2403/00 (2013.01)

(58) Field of Classification Search
CPC ...................................... C08L 97/02
See application file for complete search history.

(56) References Cited

U.S. PATENT DOCUMENTS

| | | | | |
|---|---|---|---|---|
| 3,867,324 A * | 2/1975 | Clendinning | ........... | A01C 1/046 |
| | | | | 260/DIG. 43 |
| 3,915,910 A * | 10/1975 | Nakano | ..................... | C08K 3/22 |
| | | | | 524/14 |
| 4,144,304 A * | 3/1979 | Dereppe | ................. | B29C 43/24 |
| | | | | 264/175 |
| 4,480,061 A * | 10/1984 | Coughlin | ............ | C08L 23/0876 |
| | | | | 428/146 |
| 5,908,496 A * | 6/1999 | Singule | ................... | B27N 3/002 |
| | | | | 106/271 |
| 6,337,138 B1 * | 1/2002 | Zehner | ..................... | C08K 3/34 |
| | | | | 264/142 |
| 8,642,683 B1 * | 2/2014 | Dellock | ................... | C08L 23/12 |
| | | | | 524/13 |
| 9,963,832 B2 | 5/2018 | Han et al. | | |
| 2005/0222311 A1 * | 10/2005 | Richter | .................... | C08L 23/02 |
| | | | | 524/275 |
| 2006/0270762 A1 * | 11/2006 | Noel, III | ................ | C08J 9/0061 |
| | | | | 524/35 |
| 2009/0206507 A1 * | 8/2009 | Martin | .................... | B29B 9/065 |
| | | | | 264/141 |
| 2013/0096236 A1 * | 4/2013 | Bernaerts | .................. | C08L 3/02 |
| | | | | 524/9 |
| 2014/0209841 A1 * | 7/2014 | Taunk | ....................... | C08L 3/02 |
| | | | | 252/511 |
| 2014/0235761 A1 * | 8/2014 | Yoon | ....................... | C08L 99/00 |
| | | | | 524/15 |

FOREIGN PATENT DOCUMENTS

| | | |
|---|---|---|
| CN | 105145810 A | 12/2015 |
| JP | 2000225638 A * | 8/2000 |
| JP | 2002 088264 | 3/2002 |
| JP | 2002363432 A * | 12/2002 |
| KR | 2003-0097845 A | 12/2003 |
| KR | 10-2013-0051840 A | 5/2013 |
| KR | 10-2014-0094865 A | 7/2014 |
| KR | 2015 0012804 | 2/2015 |
| KR | 101525658 B1 | 6/2015 |
| KR | 2015-0073593 A | 7/2015 |
| KR | 10-2015-0097004 A | 8/2015 |
| KR | 2017-0043423 A | 4/2017 |

OTHER PUBLICATIONS

Machine Translation of JP 2002363432 A, 2017.*
Machine Translation of KR 20130051840 A, 2017.*
Simpson et al. (Ethylene Polymers, LLDPE. Encyclopedia of Polymer Science and Technology, vol. 2, 2001) (Year: 2001).*
Machine Translation of JP-2000225638-A, 2019 (Year: 2019).*
European Search Report for PCT/KR2017/17007678, dated Jun. 4, 2019, 7 pages.

* cited by examiner

Primary Examiner — Liam J Heincer
(74) Attorney, Agent, or Firm — Adsero IP

(57) ABSTRACT

The present invention relates to a bioplastic composition comprising wheat bran that is a food byproduct and a bioplastic pellet/film using the same. More particularly, the present invention relates to a bioplastic composition comprising wheat bran and a bioplastic film using the same in which the properties of the composition are enhanced to secure the improved properties of the bioplastic film prepared from it, thereby showing a carbon reduction effect and providing a substitute for the conventional petroleum-derived bioplastic products.

15 Claims, 3 Drawing Sheets
(3 of 3 Drawing Sheet(s) Filed in Color)

BIOPLASTIC COMPOSITION COMPRISING WHEAT BRAN AND BIOPLASTIC FILM USING THE SAME

RELATED APPLICATION

This application claims priority to Korean Application Serial No. 10-2016-0083391, filed on Jul. 1, 2016, the content of which is incorporated here by reference in its entirety.

BACKGROUND OF THE INVENTION

The present invention relates to a bioplastic composition comprising wheat bran that is a food byproduct, and a bioplastic pellet or film using the same. More particularly, the present invention relates to a bioplastic composition comprising wheat bran and a bioplastic film using the same in which the properties of the composition are enhanced to secure the improved properties of the bioplastic film prepared from it, thereby showing a carbon reduction effect and providing a substitute for the conventional petroleum-derived bioplastic products.

Plastic is a polymer material of high molecular weight. With the higher molecular weight, the polymer material changes from gas into liquid or solid. As the solid material has the higher molecular weight, it displays less fluidity, better mechanical properties and higher heat resistance and possesses properties available as a material necessary in daily use like metals, lumber, ceramics, rubber, etc. Plastics are polymer materials processed by molding in combination with various types of additives, including modifiers, coloring agents, stiffeners, fillers, etc. The properties of the plastics are determined by the chemical structure of the synthetic resins like PE, PP, PVC, etc. The plastics of a same type may vary in properties depending on many factors. This feature can be used in the modification of plastics. Concerning the chemical structure, the properties of the plastics are variable according to the molecular weight, molecular weight distribution, main and side chains based on the polymer-making (i.e., polymerization) conditions, end/terminal groups, bridges, stereoregularity, copolymer composition profile, and so forth. Generally, compounding is the creation of a composition suitable for an intended use by adding various types of additives or other compounding ingredients, such as a stiffener, a modifier, etc., to a polymer ingredient, and the composition thus produced is distributed in the form of pellets.

With the recent growth in the quantity of all plastics including films used as a food wrapping material, the amount of plastic waste has increased exponentially. In terms of disposal, plastic waste is destined for landfills, incineration, or recycling. But, the petroleum-derived plastic waste, if incinerated or deposited in landfills, generates a harmful amount of toxic gas, causing air pollution, and leads to space limitations for landfills and environmental contaminations. For solving this problem, there have been brisk research and development of eco-friendly plastics that contribute to carbon reduction by making the use of plant-derived byproducts or natural materials adopting the fermentation technology. The use of such byproducts derived from plants rather than petroleum in the development of plastic compositions may give the carbon reduction effect by using a less amount of the petroleum-derived plastic materials but adversely cause deterioration of properties like elongation, tensile strength, etc. in relation to the conventional plastic compositions.

In this regard, KR Patent Publication No. 10-2015-0097004 discloses a composition for sheet using a biomass, KR Patent Publication No. 10-2014-0094865 describes a composition for biomass film, and KR Patent Publication No. 10-2013-0051840 discloses an eco-friendly biomass pellet using plant biomass. But, a bioplastic composition using wheat bran has never been disclosed concerning this matter.

PATENT DOCUMENTS

Patent Document 1: KR Patent Publication No. 10-2015-0097004 (published on Oct. 26, 2015)
Patent Document 1: KR Patent Publication No. 10-2014-0094865 (published on Jul. 31, 2014)
Patent Document 1: KR Patent Publication No. 10-2013-0051840 (published on May 21, 2013)

BRIEF SUMMARY OF THE INVENTION

It is an object of the present invention to provide a bioplastic composition comprising wheat bran that contains a polyolefin resin, wheat bran, a wax, an inorganic filler, and a surfactant.

It is another object of the present invention to provide a bioplastic pellet or film comprising the bioplastic composition.

For solving the above-described problems, there is provided a bioplastic composition comprising wheat bran that includes a polyolefin resin, wheat bran, a wax, an inorganic filler, and a surfactant.

The polyolefin resin may be at least one selected from the group consisting of polyethylene (PE), polypropylene (PP), polybutylene, and polymethylpentene.

The polyolefin resin may be contained in an amount of 40 to 70 wt. % in the composition.

The wheat bran may have a size of 5 to 30 μm, a polydispersity index (PDI) of 2 or less, and a water content of 1 to 10%. The wheat bran may be contained in an amount of 10 to 30 wt. % in the composition.

The wax may be at least one selected from the group consisting of paraffin wax, liquid paraffin wax, beeswax, montan wax, candelilla wax, polyethylene wax, and polypropylene wax. The wax may be contained in an amount of 10 to 20 wt. % in the composition.

The inorganic filler may be at least one selected from the group consisting of calcium carbonate, silica, mica, and talc. The inorganic filler may be contained in an amount of 5 to 20 wt. % in the composition.

The surfactant may be at least one selected from the group consisting of fatty acids, such as stearic acid, myristic acid, palmitic acid, arachidic acid, oleic acid, linoleic acid, and hard fatty acids, and polyols, such as glycerin, butylene glycol, propylene glycol, dipropylene glycol, pentylene glycol, hexylene glycol, polyethylene glycol, and sorbitol. The surfactant may be contained in an amount of 0.5 to 5 wt. % in the composition.

The composition may further comprise another 10 to 30 parts by weight of a polyolefin resin with respect to 100 parts by weight of the composition.

Further, there is provided a bioplastic pellet comprising the composition.

Further, there is provided a bioplastic film comprising the composition. The film may further comprise another amount of a polyolefin resin.

On the other hand, there is also provided a method for preparing a bioplastic pellet comprising wheat bran that includes: (1) mixing a polyolefin resin, wheat bran, a wax, an inorganic filler, and a surfactant together under heat to prepare a bioplastic composition comprising wheat bran; and (2) extruding, cutting and forming the bioplastic composition comprising wheat bran into pellets.

Particularly, the wheat bran may be subjected to grinding, size-sorting and separation into fine fraction prior to the mixing step.

There is also provided a method for preparing a bioplastic film that further comprises another amount of a polyolefin resin added to the bioplastic pellet made by the preparation method.

Effects of Invention

The bioplastic composition of the present invention, displaying uniform properties and high dispersity, allows the use of the existing facility in the manufacture of films and forms no holes during the manufacture of films.

Further, the bioplastic film of the present invention is similar in properties to the conventional plastic films, allowing the use of the existing facility, and thus gives the carbon reduction effect.

BRIEF DESCRIPTION OF THE SEVERAL VIEW OF THE DRAWING

Figure 1:
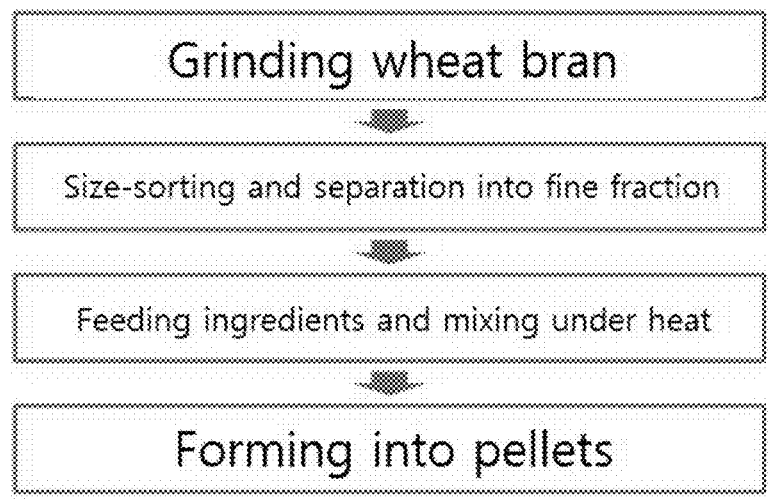
FIG. 1 is a flow chart showing the process of preparing a pellet using a bioplastic composition comprising wheat bran according to the present invention.
Figure 2:
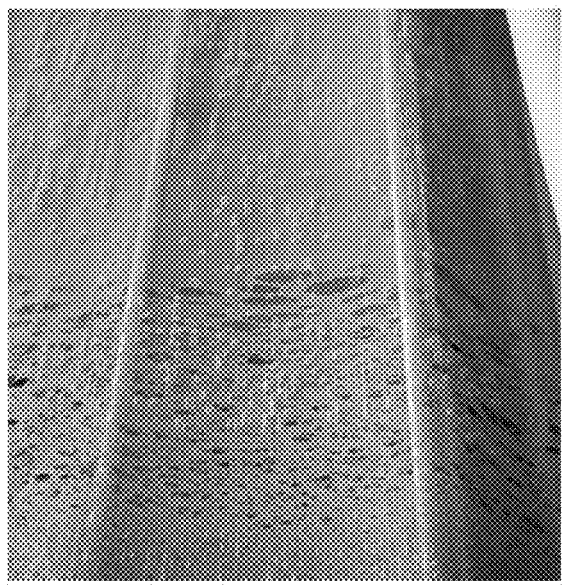
FIG. 2 is a photograph showing holes formed during the preparation of a film using a conventional composition comprising wheat bran of non-uniform size.
Figure 3:
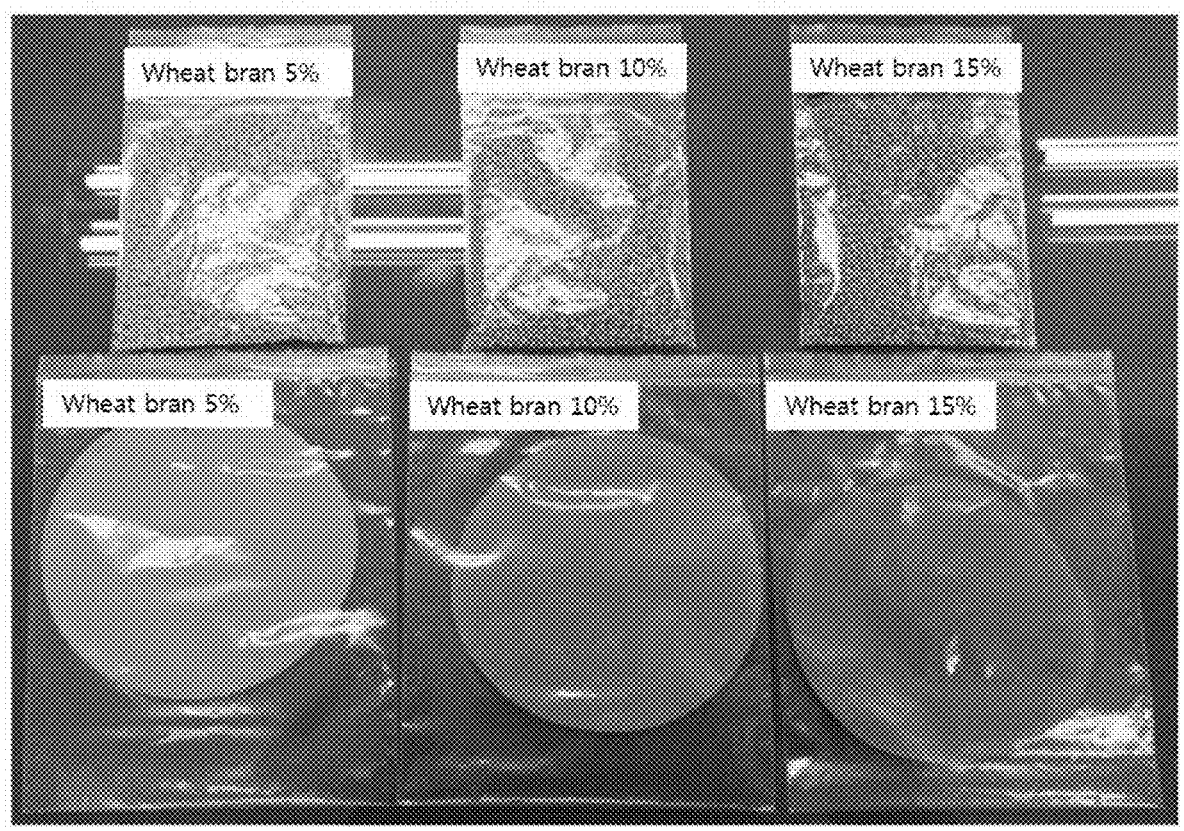
FIG. 3 is a photograph showing a pellet and a film using a bioplastic composition as a function of the content of wheat bran.

The patent or application file contains at least one drawing executed in color. Copies of this patent or patent application publication with color drawing(s) will be provided by the Office upon request and payment of the necessary fee.

DETAILED DESCRIPTION OF THE INVENTION

The present invention provides a bioplastic composition comprising wheat bran that includes a polyolefin resin, wheat bran, a wax, an inorganic filler, and a surfactant.

The polyolefin resin of the present invention may be at least one selected from the group consisting of polyethylene (PE), polypropylene (PP), polybutylene, and polymethylpentene. The polyolefin resin is preferably at least one selected from polyethylene (PE) and polypropylene (PP), more preferably, polyethylene (PE).

The polyethylene (PE) may be at least one selected from linear low-density polyethylene (LLDPE), low-density polyethylene (LDPE), and high-density polyethylene (HDPE). Further, the polyethylene may be prepared in the presence of at least one catalyst selected from a metallocene catalyst and a Zeigler-Natta catalyst, preferably, a metallocene catalyst. Unlike the Ziegler-Natta catalyst, the metallocene catalyst has a single active site, so the single-site catalyst technology can be employed to control the polymer structure precisely and thus freely realize a specific synthetic process. Particularly, M-PE refers to a polyethylene (PE) synthesized in the presence of a metallocene catalyst. M-PE is superior in processability and quality to other PEs and liable to form fewer bubbles or holes.

The polyolefin resin may be contained in an amount of 40 to 70 wt. % in the composition. When the content of the polyolefin resin is less than 40 wt. %, the composition fails to have the ingredients mix together well and has the difficulty of being processed into pellets or securing uniform properties in the manufacture of films. When the content of the polyolefin resin is greater than 70 wt. %, the composition does not take the unique color of the wheat bran and the carbon reduction effect appears insignificant. But, the composition of the present invention contains the polyolefin resin within the defined range of content, so it can take the unique color of the wheat bran, form no bubble of the bran in the manufacture of films, and secure the same appearance and quality of the existing plastic films.

The wheat bran as used in the present invention may include, among the biomass, byproducts left after production of wheat powder. More specifically, the wheat bran may be the resulting product after grinding, size-sorting and separation into fine fraction.

The size of the wheat bran may be in the range of 5 to 30 μm, preferably 10 to 25 μm. When the wheat bran has a smaller size below the defined range, the powder tends to fly to deteriorate the workability, which adversely affects the yield. When the wheat bran has a larger size above the defined range, the melting index (MI) of the composition is increased to cause a non-uniform hardness of the pellets using the composition and thus deteriorate the film processability in the manufacture of a film using the composition, ending up forming a film with holes and deviation of properties (e.g., sealing strength, tensile strength, elongation, etc.). The polydispersity of the wheat bran is defined in terms of polydispersity index (PDI). PDI is the square of the standard deviation/mean diameter. In the present invention, the PDI of the wheat bran may be 2 or less, preferably 1.5 or less. When the size polydispersity of the wheat bran is out of the defined range, the compounding properties are not uniform and the dispersity deteriorates. Within the defined PDI range, powder smaller than 30 μm may take up to about 80%.

Further, the wheat bran may have a water content of 1 to 10%. The lower water content of the wheat bran below the defined range makes the processing of the wheat bran inefficient, whereas the higher water content above the defined range causes the poor properties of the composition using the wheat bran and deteriorates the processability of the film.

The wheat bran may be contained in an amount of 10 to 30 wt. % in the composition. When the content of the wheat bran is less than the defined range, the composition cannot take the unique color of the wheat bran. When the content of the wheat bran is greater than the defined range, small particles of the wheat bran agglomerate together during the manufacture of the composition to form bubbles, which possibly deteriorates the properties (e.g., sealing strength, tensile strength, elongation, etc.) of the film and creates holes in the film during the manufacture of the film. However, the composition of the present invention, having the defined content range of the wheat bran, maintains the unique color of the wheat bran, forms no bubble during the manufacture of the film, and provides the same appearance and quality of the existing plastic films.

The wax as used in the present invention serves to connect the wheat bran and the polyolefin resin together. The wax may include, but is not limited to, at least one selected from the group consisting of paraffin wax, liquid paraffin wax, beeswax, montan wax, candelilla wax, polyethylene wax, and polypropylene wax. The wax is preferably polyethylene wax, more preferably low-density polyethylene (LDPE) wax and high-density polyethylene (HDPE) wax, which may be used alone or in combination with each other. The wax may be contained in an amount of 10 to 20 wt. % in the composition.

The inorganic filler as used in the present invention may include, but is not limited to, at least one selected from the group consisting of calcium carbonate, silica, mica, and talc. The inorganic filler is preferably calcium carbonate ($CaCO_3$) that is relatively inexpensive. The inorganic filler may be contained in an amount of 5 to 20 wt. % in the composition. The lower content of the inorganic filler below the defined range causes a deterioration in the properties and a rise of the production cost, whereas the higher content of the inorganic filler above the defined range deteriorates the properties of the composition and the film.

The surfactant as used in the present invention serves to form a coating on the surface of the wheat bran, making the wheat bran mixed well with the wax or the polyolefin resin and preventing it from being burnt. The surfactant may include, but is not limited to, at least one selected from the group consisting of fatty acids, such as stearic acid, myristic acid, palmitic acid, arachidic acid, oleic acid, linoleic acid and hard fatty acids; and polyols, such as glycerin, butylene glycol, propylene glycol, dipropylene glycol, pentylene glycol, hexylene glycol, polyethylene glycol, and sorbitol. The surfactant may be contained in an amount of 0.5 to 5 wt. % in the composition. The content of the surfactant less than 0.5 wt. % provides an insignificant effect of the surfactant, whereas the content of the surfactant greater than 5 wt. % causes deterioration in the properties of the film, like tensile strength, etc.

The composition of the present invention may further comprise another 10 to 30 parts by weight of a polyolefin resin with respect to 100 parts by weight of the composition as added after preparation of the composition. The polyolefin resin as used herein may be the same as or different from the polyolefin resin already included in the composition. Preferably, the polyolefin resin is different from the polyolefin resin included in the composition, because it can improve the properties of the film. Adding a polyolefin resin in the defined amount range may contribute to improving the properties of the film made from the composition.

The composition of the present invention may have a melting index (MI) of 1.5 to 10. The melting index (MI) of the composition below or above the defined range leads to extremely high or low fluidity of the composition, which makes the composition unsuitable for extrusion molding. Particularly, when the melting index is greater than 10, the composition tends to lump, making it impossible to form a film.

The present invention also provides a bioplastic pellet comprising the composition.

The pellet comprising the composition may be made by a preparation method that includes: (1) mixing a polyolefin resin, wheat bran, a wax, an inorganic filler, and a surfactant together under heat to prepare a bioplastic composition; and (2) extruding, cutting and forming the bioplastic composition comprising wheat bran into pellets. More specifically, the wheat bran may be subjected to grinding, size-sorting and separation into fine fraction, prior to the mixing process. The grinding process is to grind the wheat bran with a known grinding device. The size-sorting process is to classify the ground wheat bran particles by size. The separation process is collecting small-sized wheat bran particles passing through a sieve. With these procedures, fine wheat bran particles of uniform size can be obtained.

In this regard, the pellet included in the composition may have a hardness of 94 to 98 or less. The measurement of hardness is performed according to the JIS-A method. When the hardness of the pellet is out of the defined range, the dispersity is lowered to deteriorate the film processability.

The bioplastic composition of the present invention displays uniform properties and high dispersity, so it allows the use of the existing manufacturing facility and avoids formation of holes in the manufacture of films.

The present invention also provides a bioplastic film comprising the composition.

The film may possess properties that allow it to be used as a substitute for the existing petroleum-derived plastic products. More specifically, the film has a sealing strength of 0.3 to 1.4 kgf and a needle penetration resistance of 0.08 to 0.24 kgf. Further, the film elongation at break is 300 to 750% in the mechanical direction (MD) and 250 to 900% in the transverse direction (TD); and the film tensile strength is 0.4 to 1.5 kgf in the mechanical direction (MD) and 0.3 to 1.7 kgf in the transverse direction (TD). These property ranges may be applied to various types of wrappers, such as paper sack, ton bag liner, valve bag liner, etc.

The bioplastic film of the present invention may be prepared by mixing the bioplastic composition comprising wheat bran, a polyolefin resin and additives together, melting the mixture and then performing T-die extrusion or calendered molding. The bioplastic film may also be prepared by further adding a polyolefin resin to the bioplastic pellet comprising wheat bran prepared from the bioplastic composition comprising wheat bran. More specifically, the polyolefin resin as used herein may be the same as or different from the polyolefin resin included in the composition. Preferably, the polyolefin resin is different from the polyolefin resin of the composition, because it can contribute to improving the properties of the film.

The bioplastic film of the present invention is similar in properties to the conventional plastic films, allowing the use of the existing facility, and gives the carbon reduction effect.

Hereinafter, the present invention will be described in further detail with reference to the following examples, which are given in terms of an embodiment of the present invention and not construed to limit the scope of the present invention.

EXAMPLES

1. Properties of Bioplastic Film Containing Wheat Bran as a Function of Wheat Bran Size Example 1: Preparation of Composition and Film Containing Wheat Bran Powder (15 μm, PDI=1)

(1) Preparation of Bioplastic Composition Comprising Wheat Bran

Figure 4:
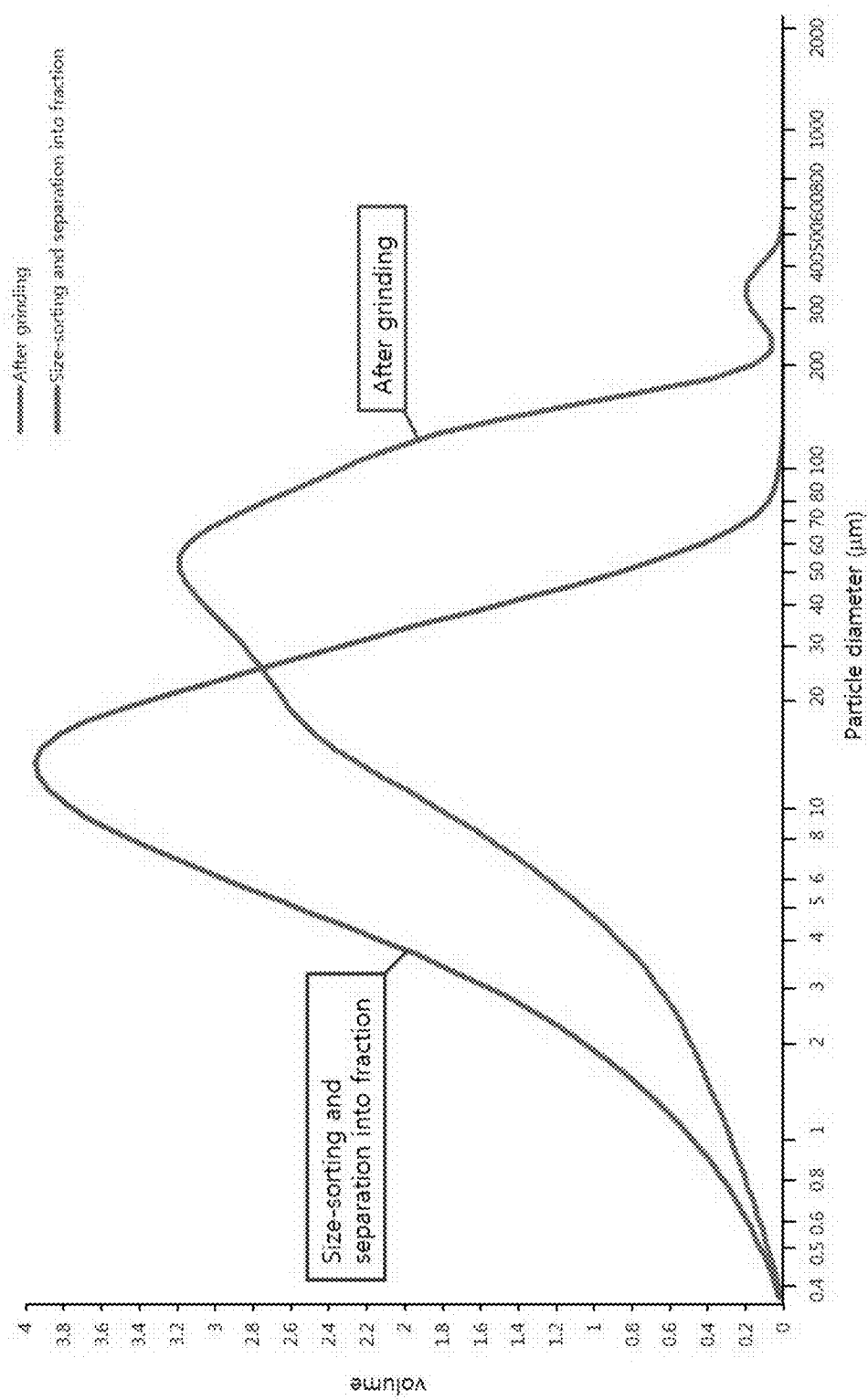
FIG. 4 is a graph showing the average volume as a function of the particle diameter when the wheat bran is ground, size-sorted and separated into fine fraction.

Wheat bran is automatically dried out in an ACM grinding machine with a blade motor controlled at 100 to 200 rpm to a water content of 7% or below, and the wheat bran particle is sized-sorted into fine fraction to yield a fine powder (15 μm and PDI=1) (See FIG. 4). The powder of the defined size range includes particles smaller than 30 μm that takes up to about %. 25 wt. % of the wheat bran powder (15 μm and PDI=1) is mixed with 50 wt. % of polyethylene (LLDPE) pellet or powder, 10 wt. % of calcium carbonate as an inorganic filler, 14 wt. % of wax, and 1 wt. % of a surfactant under heat while the temperature is controlled not to burn the wheat bran, to prepare a bioplastic composition comprising wheat bran. The bioplastic composition is then extruded and cut into pellets.

(2) Preparation of Bioplastic Film Comprising Wheat Bran 20 wt. % of the pellet thus obtained and 80 wt. % of petroleum-derived PE blending are mixed together, and a 50 μm-thick film according to the Preparation Example 1 is made.

Comparative Example 1: Preparation of Composition and Film Comprising Wheat Bran Powder (70 μm, PDI=3)

The procedures are performed in the same manner as described in Example 1, excepting that wheat bran powder (70 μm and PDI=3) is prepared and used to prepare a bioplastic composition and a bioplastic film according to the Comparative Example 1.

Experimental Example 1: Properties of Bioplastic Film Comprising Wheat Bran as a Function of Wheat Bran Size In order to determine the properties, the bioplastic films according to Example 1 and Comparative Example 1 are measured in regards to tensile strength, elongation, sealing strength, and needle penetration resistance. The measurement results are presented in Table 1.

TABLE 1

Properties of bioplastic film comprising wheat bran as a function of wheat bran size

| Item | | Example 1 | Comparative Example 1 |
|---|---|---|---|
| Wheat bran particle size (μm, PDI) | | 15, 1 | 70, 3 |
| Thickness (μm) | | 50 | 50 |
| Tensile strength (kgf, 15 mm) | TD | 1.01 | 0.34 |
|  | MD | 1.36 | 1.00 |
| Elongation at break (%) | TD | 591 | 85 |
|  | MD | 522 | 348 |
| Sealing strength (kgf) | | 0.77 | 0.66 |
| Needle penetration resistance (kgf) | | 0.14 | 0.12 |

As can be seen from Table 1, the bioplastic film of the Example 1 is superior to the bioplastic film of the Comparative Example 1 in terms of tensile strength, elongation, sealing strength, and needle penetration resistance. In other words, when the wheat bran particle is 15 μm and PDI=1 in size, the properties of the bioplastic film comprising the wheat bran can be improved.

2. Properties of Bioplastic Composition and Film Comprising Wheat Bran as a Function of Wheat Bran Content Examples 2, 3 and 4: Preparation of Bioplastic Composition Comprising Wheat Bran with Varied Wheat Bran Content The wheat bran powder (15 μm and PDI=1) prepared in the same manner as described in Example 1 is mixed with polyethylene (LLDPE) pellet or powder, calcium carbonate as an inorganic filler, 14 wt. % of wax, and 1 wt. % of other additives to prepare a bioplastic composition comprising wheat bran. The composition is then processed into pellets. The contents of the polyethylene and the inorganic filler in the pellet are presented in Table 2.

Comparative Example 2: Preparation of Film Comprising No Wheat Bran

The procedures are performed in the same manner as described in Examples 2, 3 and 4, excepting that polyethylene is used alone without wheat bran or an inorganic filler to prepare a bioplastic composition according to the Comparative Example 2. The bioplastic composition is then processed into pellets.

TABLE 2

| Div. | Example 1 | Example 2 | Example 3 |
|---|---|---|---|
| Wheat bran content | 5% | 15% | 25% |
| Polyethylene content | 70% | 60% | 50% |
| Inorganic filler content | 15% | 10% | 10% |

Experimental Example 2: Properties of Bioplastic Composition Comprising Wheat Bran as a Function of Wheat Bran Content The bioplastic compositions with varied contents of wheat bran according to Examples 2, 3 and 4 and the composition or pellet comprising no wheat bran according to Comparative Example 2 are measured in regards to melting index (MI 190° C., 2.16 kg), hardness (JIS-A), and specific gravity. The measurement results are presented in Table 3.

TABLE 3

Properties of bioplastic composition comprising wheat bran as a function of wheat bran content

| Div. | Comparative Example 2 | Example 2 | Example 3 | Example 4 |
|---|---|---|---|---|
| MI (190° C., 2.16 kg) | 1.00 | 1.43 | 1.85 | 2.26 |
| Hardness (JIS-A) | 96.5 | 97.5 | 97.5 | 95~96 |
| Specific gravity | 1.213 | 1.044 | 1.035 | 1.046 |

In the manufacture of the compositions of Examples 2, 3 and 4, the compositions have no black spot and still take a brownish color. As shown in Table 3, the compositions of Examples 2, 3 and 4 have the melting index increasing with an increase of the wheat bran content, but all of them show the melting index in the defined range appropriate to the manufacture of films in comparison with the composition of Comparative Example 2. Further, the pellets prepared from the compositions display no significant difference in the hardness from the pellet according to the Comparative Example 2. The pellets of Examples 2, 3 and 4, comprising the wheat bran, have the lower specific gravity than the pellet of Comparative Example 2, but within the defined range appropriate to the manufacture of bioplastics comprising wheat bran.

Examples 5, 6 and 7: Preparation of Bioplastic Film Comprising Wheat Bran with Varied Wheat Bran Content 20 wt. % of each of the compositions comprising wheat bran according to Examples 2, 3 and 4 is mixed with 80 wt. % of petroleum-derived PE blending (70 wt. % of LLDPE and 10 wt. % of LDPE). The resultant compositions are then processed into 50 µm-thick films according to Preparation Examples 5, 6 and 7.

Experimental Example 3: Properties of Bioplastic Film Comprising Wheat Bran as a Function of Wheat Bran Content The bioplastic films according to Examples 5, 6 and 7 are measured in regards to tensile strength, elongation, sealing strength, and needle penetration resistance. The measurement results are presented in Table 4.

TABLE 4

Properties of bioplastic film comprising wheat bran as a function of wheat bran content

| Item | | Example 5 | Example 6 | Example 7 |
|---|---|---|---|---|
| Wheat bran content | | 5% | 15% | 25% |
| Thickness (µm) | | 50 | 50 | 50 |
| Tensile strength | TD | 1.60 | 1.08 | 0.65 |
| (kgf, 15 mm) | MD | 1.42 | 0.83 | 0.41 |
| Elongation at | TD | 552.97 | 452.72 | 318.48 |
| break (%) | MD | 661.72 | 613.47 | 350.71 |
| Sealing strength (kgf) | | 0.88 | 0.59 | 0.40 |
| Needle penetration resistance (kgf) | | 0.18 | 0.15 | 0.09 |

In the manufacture of the films of Examples 5, 6 and 7, the films have no bubble of wheat bran and display a thickness deviation of ±2% or less because the compositions possess uniform properties and high dispersity. As can be seen from Table 4, the bioplastic films of Examples 5, 6 and 7 have tensile strength, elongation, sealing strength, and needle penetration resistance at proper levels for use as a wrapper.

3. Properties of Bioplastic Composition and Film Comprising Wheat Bran as a Function of Polyolefin Resin Examples 8 to 12: Preparation of Bioplastic Composition Comprising Wheat Bran with Varied Polyolefin Resin The wheat bran powder prepared in the same manner as described in Example 1 is mixed with polyethylene pellet or powder, a catalyst, calcium carbonate as an inorganic filler, wax, and 1 wt. % of other additives to prepare a bioplastic composition comprising wheat bran. The contents of wheat bran, polyethylene, inorganic filler, wax, and other additives are as presented in Table 5.

Comparative Examples 3 and 4: Preparation of Bioplastic Composition Comprising No Wheat Bran The procedures are performed in the same manner as described in Examples 8 to 12, excepting that polyethylene and a catalyst are used without wheat bran to prepare bioplastic compositions of Comparative Example 3 (polyolefin resin 100%, metallocene catalyst) and Comparative Example 4 (polyolefin resin 100%, Ziegler-Natta catalyst).

TABLE 5

| | Example | | | | |
|---|---|---|---|---|---|
| Div. | 8 | 9 | 10 | 11 | 12 |
| Wheat bran content | 5% | 15% | 25% | 50% | 30% |
| Polyolefin resin | 70% | 60% | 50% | 35% | 60% |
| Catalyst | | Metallocene | | | Ziegler-Natta |
| Calcium carbonate content | 15% | 10% | 10% | 10% | 10% |
| Wax | 14% | 14% | 14% | 14% | 14% |
| Other additives | 1% | 1% | 1% | 1% | 1% |

Experimental Example 3: Properties of Bioplastic Composition Comprising Wheat Bran as a Function of Polyethylene In order to determine whether the compositions of Examples 8 to 12 are suitable for the manufacture of bioplastic films, the compositions of Examples 8 to 12 with varied wheat bran content, polyolefin resin and catalyst and the compositions of Comparative Examples 3 and 4 comprising no wheat bran are measured in regards to melting index (MI 190° C., 2.16 kg) and specific gravity. The measurement results are presented in Table 6.

TABLE 6

Properties of bioplastic composition comprising wheat bran as a function of polyolefin resin

| | Comparative Example | | Example | | | | |
|---|---|---|---|---|---|---|---|
| Div. | 3 | 4 | 8 | 9 | 10 | 11 | 12 |
| MI (190° C., 2.16 kg) | 1.0 | 1.9 | 1.43 | 1.85 | 2.26 | 2.3 | 4.12 |
| Specific gravity | 0.921 | 0.922 | 1.044 | 1.035 | 1.046 | 1.05 | 1.088 |

As can be seen in Table 6, the melting index (MI) increases with an increase in the wheat bran content and appears more uniform when using a metallocene catalyst than a Ziegler-Natta catalyst. But, all the compositions of Examples 8 to 12 show the melting index in the defined range appropriate to the manufacture of films. The compositions of Examples 8 to 12, comprising the wheat bran, have the higher specific gravity than those of Comparative Examples 3 and 4, but within the defined range appropriate to the manufacture of bioplastics comprising wheat bran.

Examples 13 and 14: Preparation of Bioplastic Film Comprising Wheat Bran with Varied Polyolefin Resin The procedures are performed in the same manner as described in Example 12, excepting that the composition comprising wheat bran according to Example 12 is used in the presence of a metallocene catalyst other than a Ziegler-Natta catalyst to prepare a composition comprising wheat bran, which is then processed into a pellet. 20 wt. % of the pellet is mixed with 80 wt. % of petroleum-derived PE blending (70 wt. % of LLDPE and 10 wt. % of LDPE), and the mixture is then processed to form 50 µm-thick bioplastic films of Example 13 (Hanwha 3305) and Example 14 (LGSE1020A).

Comparative Example 5: Preparation of Film Not Using Bioplastic Composition Comprising Wheat Bran The procedures are performed in the same manner as described in Examples 13 and 14, excepting that 100 wt. % of petroleum-derived PE (blending) (80 wt. % of LLDPE and 20 wt. % of LDPE) is used without the bioplastic composition comprising wheat bran to prepare a film of Comparative Example 5.

Experimental Example 4: Properties of Bioplastic Film Comprising Wheat Bran as a Function of Polyolefin Resin In order to evaluate the properties, the bioplastic films of Examples 13 and 14 are measured in regards to sealing strength. The measurement results are presented in Table 7.

TABLE 7

Properties of bioplastic film comprising wheat bran as a function of polyolefin resin

| Div. | Sealing strength (kgf) |
| --- | --- |
| Comparative Example 5 | 1.1368 |
| Example 13 | 1.0082 |
| Example 14 | 1.0315 |

As can be seen from Table 7, the bioplastic films of Examples 13 and 14 are a little bit lower in sealing strength, needle penetration resistance and elongation than that of Comparative Example 5, but within a level appropriate to the film processing. It is therefore possible to provide bioplastic films similar in properties to the existing plastic films and giving a carbon reduction effect.

4. Change of Properties of Bioplastic Composition Comprising Wheat Bran According to Addition of Another Ingredient Examples 15, 16 and 17: Preparation of Bioplastic Film Comprising Wheat Bran with Addition of Another Ingredient 100 parts by weight of the composition comprising wheat bran according to Example 4 is mixed with another 20 parts by weight of LLDPE to prepare a bioplastic composition, which is then processed into a pellet. 20 wt. % of the pellet is mixed with 80 wt. % of petroleum-derived PE blending (70 wt. % of LLDPE and 10 wt. % of LDPE), and the mixture is processed to form a 50 μm-thick bioplastic film of Example 15. The same procedures are performed as described above, excepting that a composition comprising 20 parts by weight of LDPE or M-PE in place of LLDPE is used to prepare a bioplastic film of Examples 16 or 17, respectively.

Experimental Example 5: Properties of Bioplastic Film Comprising Wheat Bran with Addition of Another Ingredient In order to evaluate the properties, the bioplastic films of Examples 15, 16 and 17 are measured in regards to sealing strength, needle penetration resistance and elongation. The measurement results are presented in Table 8.

TABLE 8

Properties of bioplastic film comprising wheat bran with another ingredient

| Item | | Example 15 | Example 16 | Example 17 |
| --- | --- | --- | --- | --- |
| Composition | | 100 parts by weight of 25% wheat bran + 20 parts by weight of LLDPE | 100 parts by weight of 25% wheat bran + 20 parts by weight of LDPE | 100 parts by weight of 25% wheat bran + 20 parts by weight of M-PE |
| Thickness (μm) | | 50 | 50 | 50 |
| Tensile strength (kgf, 15 mm) | TD | 0.89 | 0.88 | 0.80 |
| | MD | 0.64 | 0.53 | 0.53 |
| Elongation at break (%) | TD | 431.29 | 266.22 | 341.79 |
| | MD | 416.04 | 532.47 | 324.47 |
| Sealing strength (kgf) | | 0.57 | 0.64 | 0.58 |
| Needle penetration resistance (kgf) | | 0.14 | 0.11 | 0.12 |

As can be seen from Table 8, the bioplastic films of Examples 15, 16 and 17 are higher in tensile strength, sealing strength, needle penetration resistance, and elongation than the bioplastic film of Example 7. It is therefore considered that the addition of another ingredient to the composition can change the properties according to the composition ratio.

What is claimed is:

1. A bioplastic composition comprising a polyolefin resin, wheat bran having a size of 5 to 30 μm and a polydispersity index (PDI) of 2 or less, a wax, an inorganic filler, and a surfactant, wherein the polyolefin comprises polyethylene synthesized in the presence of a metallocene catalyst;
wherein the wax is contained in an amount of 14 to 20 wt. % in the composition.

2. The bioplastic composition as claimed in claim 1, wherein the polyolefin resin further comprises at least one selected from the group consisting of polyethylene (PE), polypropylene (PP), polybutylene, and polymethylpentene.

3. The bioplastic composition as claimed in claim 1, wherein the polyolefin resin is contained in an amount of 40 to 70 wt. % in the composition.

4. The bioplastic composition as claimed in claim 1, wherein the wheat bran has a water content of 1 to 10%.

5. The bioplastic composition as claimed in claim 1, wherein the wheat bran is contained in an amount of 10 to 30 wt. % in the composition.

6. The bioplastic composition as claimed in claim 1, wherein the wax is at least one selected from the group consisting of paraffin wax, liquid paraffin wax, beeswax, montan wax, candelilla wax, polyethylene wax, and polypropylene wax.

7. The bioplastic composition as claimed in claim 1, wherein the inorganic filler is at least one selected from the group consisting of calcium carbonate, silica, mica, and talc, wherein the inorganic filler is contained in an amount of 5 to 20 wt. % in the composition.

8. The bioplastic composition as claimed in claim 1, wherein the surfactant is at least one selected from the group consisting of fatty acids and polyols, wherein the fatty acids are at least one selected from the group consisting stearic acid, myristic acid, palmitic acid, arachidic acid, oleic acid, linoleic acid, and hard fatty acids, wherein the polyols are at least one selected from the group consisting glycerin, butylene glycol, propylene glycol, dipropylene glycol, pentylene glycol, hexylene glycol, polyethylene glycol, and sorbitol, wherein the surfactant is contained in an amount of 0.5 to 5 wt. % in the composition.

9. The bioplastic composition as claimed in claim 1, wherein the composition further comprises another 10 to 30 parts by weight of a second polyolefin resin with respect to 100 parts by weight of the composition as added after preparation of the composition.

10. A bioplastic pellet comprising the composition as claimed in claim 1.

11. A bioplastic film comprising the composition as claimed in claim 1.

12. The bioplastic film as claimed in claim 11, wherein the film further comprises a second polyolefin resin.

13. A method for preparing a bioplastic pellet, which comprises a bioplastic composition comprising wheat bran, the method comprising:
 (1) mixing a polyolefin resin, wheat bran having a size of 5 to 30 μm and a polydispersity index (PDI) of 2 or less, a wax, an inorganic filler, and a surfactant together under heat to prepare a bioplastic composition comprising wheat bran; and
 (2) forming the bioplastic composition into pellets;
 wherein the polyolefin comprises polyethylene synthesized in the presence of a metallocene catalyst; and
 wherein the wax is contained in an amount of 14 to 20 wt. % in the composition.

14. The method as claimed in claim 13, wherein the wheat bran is subjected to grinding, size-sorting and separation into fine fraction prior to the step of adding and mixing under heat.

15. A method for preparing a bioplastic film comprising wheat bran, the method comprising: further adding a second polyolefin resin to the bioplastic pellet made by the preparation method as claimed in claim 13.

* * * * *